United States Patent [19]

Naegeli et al.

[11] 4,153,388
[45] May 8, 1979

[54] METHOD AND APPARATUS FOR MONITORING THE STATE OF OSCILLATION OF THE BLADES OF A ROTOR

[75] Inventors: John P. Naegeli, Winterthur; Andreas Maurer, Seuzach, both of Switzerland

[73] Assignee: Sulzer Brothers Limited, Winterthur, Switzerland

[21] Appl. No.: 790,945

[22] Filed: Apr. 26, 1977

[30] Foreign Application Priority Data

Apr. 30, 1976 [CH] Switzerland ................ 5425/76

[51] Int. Cl.² ........................................... F01D 21/00
[52] U.S. Cl. ..................................... 416/61; 415/118; 416/1
[58] Field of Search ................ 416/61, 1; 415/118

[56] References Cited
U.S. PATENT DOCUMENTS

| | | | |
|---|---|---|---|
| 1,502,904 | 7/1924 | Campbell | 416/61 |
| 2,677,273 | 5/1954 | Johnson | 415/118 X |
| 2,745,969 | 5/1956 | Keller | 416/61 X |
| 3,467,358 | 9/1969 | Zablotsky et al. | 416/61 X |
| 3,573,520 | 4/1971 | Dorshimer | 416/61 X |
| 4,056,748 | 11/1977 | Cross et al. | 416/61 X |

FOREIGN PATENT DOCUMENTS

| | | | |
|---|---|---|---|
| 1100568 | 9/1955 | France | 416/61 |
| 818291 | 8/1959 | United Kingdom | 416/61 |
| 1344617 | 1/1974 | United Kingdom | 415/118 |

*Primary Examiner*—Everette A. Powell, Jr.
*Attorney, Agent, or Firm*—Kenyon & Kenyon, Reilly, Carr & Chapin

[57] ABSTRACT

A pulse generator is used to emit a pulse train of specific frequency while two pick-ups—one adjacent a circumferential array of control lugs on the rotor and the other adjacent the blades—emit start counting and stop counting pulses. The number of pulses generated by an external pulse generator are counted during the time interval for the passage of two lugs past a pick-up and the time interval for the passage of two adjacent blades past a pick-up for each revolution of the rotor. A quotient is then obtained from the two pulse numbers for each revolution and the difference between the maximum and minimum values of the quotients obtained during continued rotation is determined. If the difference exceeds a preset critical value, an activity signal is generated, for example to set off an alarm.

6 Claims, 5 Drawing Figures

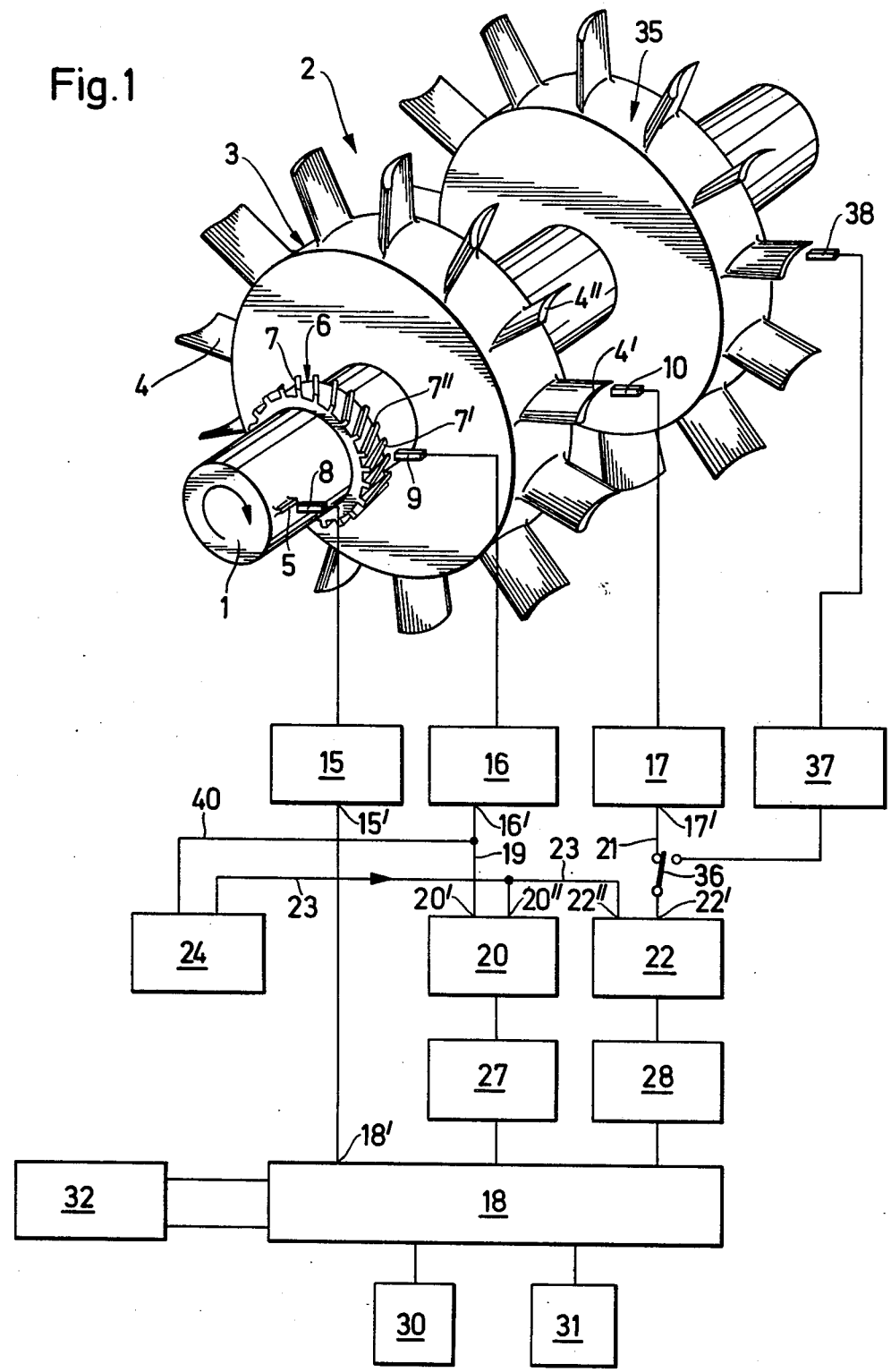

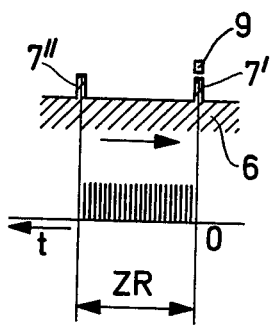
Fig. 2a
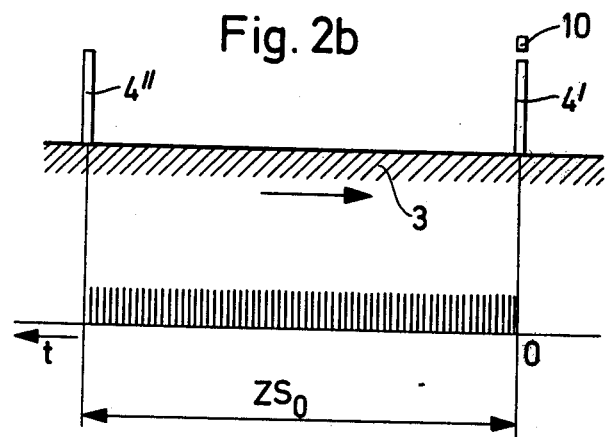
Fig. 2b
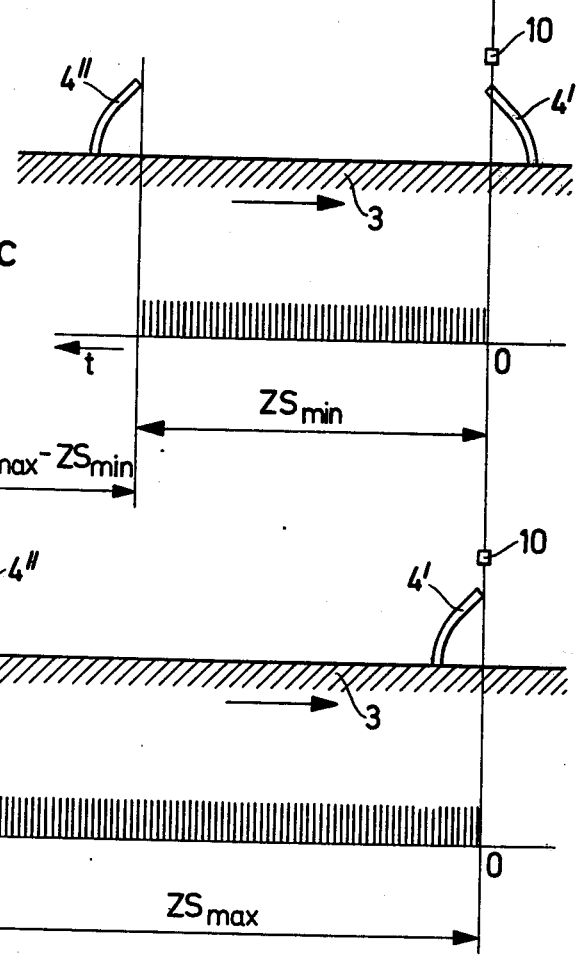
Fig. 2c
Fig. 2d

METHOD AND APPARATUS FOR MONITORING THE STATE OF OSCILLATION OF THE BLADES OF A ROTOR

This invention relates to a method and apparatus for monitoring the state of oscillation of the blades of a rotor and, particularly, a rotor of an axial turbomachine.

It is well known that the moving blades on a rotor of an axial turbomachine may be set into oscillation in the event of disturbances in the flow within the machine, e.g. due to upstream and downstream guide vanes. In some cases, these oscillations may reach such values that the blades suffer fatigue and finally break due to the high cyclic loading.

In order to preclude failure due to high cyclic loading, various techniques have been used to monitor the blade oscillations of a rotor. For example, as described in U.S. Pat. No. 3,467,358, the state of oscillation of each moving blade is monitored by comparing the sequence of reference pulses per unit of time with the sequence of measurement pulses per unit of time. The amplitude of the oscillations of the blade tips is then determined from the difference between the two types of pulse per unit of time. However, one disadvantage of this method is that if the rotor has a number of blade rings having different numbers of blades, a ring of reference control lugs with an associated pick-up is required for each ring of blades with each ring of control lugs adapted to the number of blades and the circumferential blade position. Another disadvantage is that torsional oscillations of the rotor and thermally or mechanically produced rotor displacements may falsify the results of the measurement.

Accordingly, it is an object of the invention to provide a means of monitoring all the blades of a turbomachine with a single ring of reference control lugs.

It is another object of the invention to provide a method and apparatus for monitoring blade oscillations of a turbomachine rotor in a relatively simple manner free of thermal or mechanical rotor displacements or torsional oscillations of the rotor.

It is another object of the invention to monitor the blade oscillations of a turbomachine rotor without being influenced by deviations in the blade pitch and/or the arrangement of pick-ups.

Briefly, the invention provides a method and apparatus for measuring or monitoring the state of oscillation of the blades of a rotor of an axial turbomachine without physical contact.

To this end, the method comprises the step of generating a pulse train of specific frequency during rotation of the rotor while generating start counting and stop counting or timing pulses during rotation of the rotor by means of the reference control lugs on rotor and a first pick-up and start counting and stop counting or timing pulses by means of the blades and a second pick-up. The pulses of the pulse train are then counted on each rotor revolution during an interval of time determined by passage of two successive lugs past the first pick-up to obtain a reference pulse number and during an interval of time determined by passage of two successive blades past the second pick-up to obtain a blade pair pulse number. A quotient of these pulse numbers is thereafter obtained for each rotor revolution for each pair of blades. The maximum and minimum values of the quotients obtained during continued rotation of the rotors is then determined along with the difference between the maximum and minimum values. The difference is then compared with a preset critical value and an activity signal is generated in response to the difference exceeding the critical value. This activity signal can be used, for example, to actuate an alarm.

The apparatus of the invention comprises an external pulse generator which generates a pulse train, a circumferential array of reference control lugs on the rotor, a first pick-up adjacent the lugs for generating timing pulses during rotation of the rotor with each pulse corresponding to the passage of a respective lug past the pick-up, and a second pick-up adjacent the blades for generating timing pulses during rotation of the rotor with each pulse corresponding to passage of a respective blade past the pick-up.

In addition, the apparatus includes, a pair of switches, a pair of counters and an evaluating unit.

The pulse generator generates a pulse train of specific frequency during rotation of the rotor. If the rotor speeds are low, it may be necessary to reduce the pulse frequency of the pulse generator and, for this purpose, the pulse train of the pulse generator may be controllable in dependence on the speed of rotation of the rotor.

One of the switches has a first input connected to the first pick-up to receive the timing pulses as well as a second input connected to the pulse generator to receive the pulse train. Similarly, the second switch has a first input connected to the second pick-up to receive the timing pulses as well as a second input connected to the pulse generator to receive the pulse train.

One counter is connected to the first switch and pulse generator for counting the number of pulses of the pulse train during a time interval between two consecutive timing pulses to obtain a reference pulse number for each revolution of the rotor. The other counter is connected to the second switch and pulse generator for counting the number of pulses of the pulse train during a time interval between two consecutive timing pulses of this switch to obtain a blade-pair pulse number for each revolution of the rotor.

The evaluation unit is connected to each counter to receive the pulse numbers for each revolution of the rotor. In addition, the evaluation unit functions to (a) calculate the quotient of the pulse numbers, i.e. the number of pulses counted by the two counters for each revolution of the rotor, (b) determine the maximum and minimum values of the quotients during continued rotation of the rotor, (c) calculate the difference between the maximum and minimum values of the quotients, (d) compare the difference with a preset critical value, and (e) generate an activity signal in response to the difference exceeding the critical value.

If the rotor has a number of blade rings with different numbers of blades, then a pick-up is positioned adjacent each blade ring and the second switch is connected via a selector switch to the respective pick-ups of the blade rings to be monitored.

These and other objects and advantages of the invention will become more apparent from the following detailed description and appended claims taken in conjunction with the accompanying drawings in which:

FIG. 1 illustrates an apparatus according to the invention partially in the form of a block diagram;

FIG. 2a diagrammatically illustrates the relationship between a reference pulse number and the positions of two adjacent control lugs in accordance with the invention;

FIG. 2b diagrammatically illustrates the relationship between a measurement pulse number and the position of two adjacent blades in accordance with the invention;

FIG. 2c diagrammatically illustrates the relationship between a minimum measurement pulse number and the position of two adjacent blades; and FIG. 2d diagrammatically illustrates the relationship between a maximum measurement pulse number and the position of two adjacent blades.

Referring to FIG. 1, a shaft 1 of the rotor 2 of an axial turbomachine has a ring 3 of blades 4 of known construction. In order to monitor or measure the oscillation of the blade 4 during rotation of the rotor 2, a control lug 5 is disposed on the shaft 1 along with a ring 6 of reference control lugs 7. In addition, three pick-ups 8, 9 and 10, e.g. of the inductive type, are disposed in the turbomachine housing (not shown) in a plane extending through the longitudinal axis of the rotor 2. The ring 6 has at least as many control lugs 7 as the ring of the rotor 2 - which has the largest number of blades 4 - has blades. Pick-up 8 cooperates with control lug 5, pick-up 9 cooperates with reference control lugs 7 of the ring 6, and pick-up 10 cooperates with the blades 4 of the ring 3. Whenever a reference control lugs 7 and a blade 4 pass, the pick-ups 9 and 10 produce a timing pulse.

The outputs of the pick-ups 8, 9 and 10 are each connected to an input of a pulse converter 15, 16 and 17, each of which converts the pick-up generated pulses to voltage pulses of a specific shape and amplitude.

One output 15' of the pulse converter 15 is connected to an input 18' of an evaluating unit 18 which is constructed in the form of a computer. One output 16' of the pulse converter 16 is connected via a line 19 to an input 20' of a switch 20, e.g. an electronic logic circuit to receive the reference pulses. Similarly, one output 17' of the pulse converter 17 is connected via a line 21 to one input 22' of a switch 22, e.g. again an electronic logic circuit to receive the measurement pulses. Each of the switches 20, 22 also has a second input 20", 22" connected via a line 23 to a pulse generator 24 which continuously generates pulses of a specific frequency, i.e. a pulse train. This pulse generator 24 is externally disposed relative to the rotor 2. The switch 20 is connected to the evaluating unit 18 via a counter 27, while the switch 22 is also connected via a counter 28 to the evaluating unit 18.

The system operates as follows:

One measuring operation comprises a number of revolutions of the rotor 2. While the rotor 2 is rotating, the pulse generator 24 is switched on and then generates a continuous stream of pulses to the inputs 20", 22" of the switches 20, 22 respectively. A measuring operation is started by the pick-up 8 as the control lug 5 passes. When a reference control lug 7' of the reference ring 6 passes the pick-up 9, the pickup 9 generates a pulse which is fed to the input 20' of the switch 20 via the pulse converter 16 and line 19. The switch 20 is closed by the pick-up 9 when the pick-up generates a second pulse as the next reference control lug 7" passes.

In the interval of time between these two pulses, the counter 27 counts the number of pulse generator pulses of the pulse train passed to the switch 20 during that interval. Taking into account the frequency of rotation of the rotor 2, the number ZR of these pulses is thus a measure for the length of the arc between the reference control lugs 7' and 7" of the reference ring 6. The number of pulses ZR—hereinafter referred to as reference pulse number—acts as a time and comparison basis for the measuring operation (FIG. 2a).

When a blade 4' on the rotor ring 3 passes the pick-up 10, the pick-up 10 generates a pulse which is fed to the input 22' of the switch 22 via the pulse converter 17 and line 21. This pulse opens the switch 22 and passes the pulses of the pulse generator 24 to the counter 28, which starts to count them. The switch 22 is closed when the next blade 4" passes the pick-up 10. Taking into account the frequency of rotation of the rotor 2, the number of pulses ZS of the pulse train counted during this interval of time by the counter 28 corresponds to the instantaneous arc distance between the tips of the two blades 4' and 4". This arc distance depends on the instantaneous oscillatory state of the blade tips and is thus variable. The arc ditance between individual pairs of blades of a ring is also variable because of the irregularitiy in the blade pitch due to production techniques.

Reference $ZA_O$ in FIG. 2b denotes the number of pulses counted by the counter 28 when the blades 4', 4" are not in oscillation. Pulse counting starts when the blade 4' reaches the pick-up 10, and ends when the next blade 4" reaches the pick-up 10. If the blades oscillate, ZS increases or decreases, depending upon the position of oscillation and the amplitude of oscillation of the blades 4' and 4" on reaching the pick-up 10. If blade 4" deflects in the direction of rotation of the rotor at that time, its tip reaches the pick-up 10 all the sooner, the greater the amplitude of its osciliation. In other words, the number of pulses ZS is correspondingly smaller. FIG. 2c shows the number of pulses $ZS_{min}$ when the blade 4" deflects with maximum amplitude in the direction of rotation and blade 4' deflects with maximum amplitude in the opposite direction thereto. If, on the other hand, blade 4" deflects in the opposite direction (FIG. 2d) to the direction of rotation on reaching the pick-up 10, its tip reaches the pick-up later, i.e. the number of pulses ZS is larger. FIG. 2d shows the number of pulses $ZS_{max}$ counted when blade 4" deflects with maximum amplitude in the opposite direction to the direction of rotation and blade 4' deflects with maximum amplitude in the direction of rotation. Therefore, on each rotation, there is a specific value ZS for each pair of blades on the rotor which varies according to the amplitude and position of oscillation.

When the switches 20 and 22 are closed, i.e. on termination of counting of pulse numbers ZR and ZS by the counters 27 and 28, their contents are read into the evaluating unit 18. The counted number of pulses ZR and ZS depend equally on the speed of rotation of the machine and the pulse frequency of the pulse generator 24. To avoid this dependency, the evaluating unit first forms the quotient ZS/ZR and calculates the reduced number of pulses $ZS' = ZS/ZR \cdot K$, where K is a large constant number. This value ZS' is stored in the evaluating unit. The value ZS' is formed and stored in the evaluating unit for each pair of blades passing the pick-up 10 during one revolution of the rotor.

The values ZS' vary for each pair of blades from one revolution of the rotor to the next according to how the blade tips deflect circumferentially because of their oscillatory movement, i.e. according to the amplitude and position of oscillation on reaching the pick-up 10. For this reason, the measuring operation is carried out for a number of revolutions to cover a large number of instantaneous positions of the blade tips; these positions include the extreme values $ZS_{max}$ and $ZS_{min}$. During one measuring operation covering a number of revolutions of the rotor, the evaluating unit 18 determines, for each blade, the values $ZS'_{max}$ and $ZS'_{min}$. At the end of each measuring operation, the difference between the maximum and minimum values ($ZS'_{max} - ZS'_{min}$) for each pair of blades is determined. The differential values of all the pairs of blades are compared in the evaluating unit with a preset critical value for the amplitudes of the blade oscillations. As soon as this critical value is exceeded, the evaluating unit generates an activity signal, e.g. for actuating an alarm 30. The evaluating unit may additionally influence the state of operation of the machine via a control system 31.

The duration of the measuring operation is determined by the evaluating unit 18 on the basis of the pulses from the pick-up 8 and the predetermined selective number of revolutions per measuring operation. The machine operating data and the blade oscillation critical value can be introduced into the evaluating unit 18 via an input and output unit 32 (FIG. 1). The evaluating unit 18 can print out, via the output unit 32, a report on the amplitudes of the oscillations of all the blades occurring during a measuring operation.

In order to avoid the numbers of pulses ZR and ZS becoming excessive at low speeds of revolution of the machine, the counting pulse frequency of the pulse generator 24 can be controlled in proportion to the rotor speed. However, the counting pulse frequency must be high enough to cover at least the smallest amplitude of oscillation. The frequency control of the pulse generator 24 can be effected by the pick-up 9, for which purpose the pulse generator 24 should be connected to the output 16' of pulse converter 16 via line 40.

If another blade ring of the rotor 2 is to be measured or monitored, for example where the rotor 2 has a plurality of rings of blades with a different number of blades in at least one other blade ring 35, the monitoring apparatus has at least a third pick-up 38 adjacent the blade ring 35 for generating timing pulses during rotation of the rotor 2 corresponding to passage of the respective blades past the pick-up 38. Also, the apparatus has a selector switch 36 for selectively connecting the input 22" of the switch 22 from the pick-up 10 to the other pick-up 38 via a pulse converter 37. The pick-up 10 and pulse converter 17 are then switched off and a measurement takes place as described in connection with blade ring 3.

The evaluating unit 18 is of suitable structure in order to carry out the various functions noted above.

What is claimed is:

1. A method of monitoring the state of oscillation of the blades of a rotor of an axial turbomachine without physical contact, said method comprising the steps of
   generating a pulse train of specific frequency during rotation of the rotor;
   counting the pulses of said pulse train on each rotor revolution during an interval of time determined by passage of two successive lugs on the rotor past a first pick-up to obtain a reference pulse number;
   counting the pulses of said pulse train on each rotor revolution during an interval of time determined by passage of two successive blades past a second pick-up to obtain a blade pair pulse number;
   thereafter obtaining a quotient of said pulse numbers on each rotor revolution for each pair of blades;
   determining the maximum aand minimum values of said quotients during continued rotation of the rotor;
   thereafter determining the difference between said maximum and minimum values of said quotients;
   comparing said difference with a preset critical value; and
   generating an activity signal in response to said difference exceeding said critical value.

2. A method as set forth in claim 1 which further comprises the step of activating an alarm in response to generation of said activity signal.

3. An apparatus for monitoring the state of oscillation of the blades of a rotor of an axial turbomachine without physical contact, said apparatus comprising
   a circumferential array of reference control lugs for mounting on the rotor;
   a first pick-up adjacent said control lugs for generating timing pulses during rotation of the rotor, each said pulse corresponding to passage of a respective lug past said pick-up;
   a second pick-up adjacent the blades for generating timing pulses during rotation of the rotor, each said latter pulse corresponding to passage of a respective blade past said second pick-up;
   a pulse generator externally disposed relative to the rotor for generating a pulse train of specific frequency during rotation of the rotor;
   a first switch having a first input connected to said first pick-up to receive said timing pulses therefrom and a second input connected to said pulse generator to receive said pulse train;
   a second switch having a first input connected to said secod pick-up to receive said timing pulses therefrom and a second input connected to said pulse generator to receive said pulse train;
   a first counter connected to said first switch for counting the number of pulses of said pulse train passed by said first switch during the time interval between each two consecutive timing pulses from said first pick-up to obtain reference pulse numbers for each revolution of the rotor;
   a second counter connected to said second switch for counting the number of pulses of said pulse train passed by said second switch during the time interval between two consecutive timing pulses from said second pick-up to obtain blade-pair pulse numbers for each revolution of the rotor; and
   an evaluating unit connected to each said counter to receive said pulse numbers for each revolution of the rotor and to (a) calculate the quotient of said pulse numbers for each blade pair for each revolution of the rotor; (b) determine the maximum and minimum values of the quotients during continued rotation of the rotor; (c) calculate the difference between the maximum and minimum values of the quotients; (d) compare the difference with a preset critical value; and (e) generate an activity signal in response to said difference exceeding said critical value.

4. An apparatus as set forth in claim 3 for a rotor having a plurality of rings of blades with a different number of blades in at least one other blade ring, said apparatus further comprising at least a third pick-up adjacent said other blade ring for generating timing pulses during rotation of the rotor corresponding to passage of the respective blades past said third pick-up, and a selector switch for selectively connecting said first input of said second switch from said second pick-up to said third pick-up.

5. An apparatus as set forth in claim 3 wherein said pulse generator generates a pulse train which is controllable in dependence on the speed of rotation of the rotor.

6. An apparatus as set forth in claim 3 wherein said array of lugs is separate from the blades of the rotor.

* * * * *

UNITED STATES PATENT AND TRADEMARK OFFICE
CERTIFICATE OF CORRECTION

PATENT NO. : 4,153,388
DATED : May 8, 1979
INVENTOR(S) : John P. Naegeli et al

It is certified that error appears in the above-identified patent and that said Letters Patent are hereby corrected as shown below:

Column 5, line 4, change "$(ZS'_{max} - zs'_{min})$" to --$(ZS'_{max} - ZS'_{min})$--

Column 6, line 11, change "circumferentical" to --circumferential--

Column 5, line 64, change "aand" to --and--

Signed and Sealed this

Thirtieth Day of October 1979

[SEAL]

Attest:

RUTH C. MASON
Attesting Officer

LUTRELLE F. PARKER
Acting Commissioner of Patents and Trademarks